United States Patent

Kato et al.

Patent Number: 6,065,846
Date of Patent: May 23, 2000

[54] INDICATING INSTRUMENT HAVING LIGHT CONDUCTING PLATE

[75] Inventors: Takahira Kato, Kariya; Satoru Tamura, Anjo, both of Japan

[73] Assignee: Denso Corporation, Kariya, Japan

[21] Appl. No.: 09/184,884

[22] Filed: Nov. 3, 1998

Related U.S. Application Data

[63] Continuation-in-part of application No. 08/814,020, Mar. 10, 1997, abandoned.

[30] Foreign Application Priority Data

Apr. 24, 1996 [JP] Japan ..................................... 8-102966

[51] Int. Cl.⁷ ..................................................... G01D 11/28
[52] U.S. Cl. ................................ 362/30; 362/26; 362/23; 362/307; 362/327
[58] Field of Search .................................. 362/26, 30, 23, 362/28, 29, 31, 85, 307, 327

[56] References Cited

U.S. PATENT DOCUMENTS

| 4,218,726 | 8/1980 | Fukasawa et al. . |
| 4,771,368 | 9/1988 | Tsukamoto et al. . |
| 5,247,429 | 9/1993 | Iwase et al. . |
| 5,678,912 | 10/1997 | Ayres et al. . |

*Primary Examiner*—Sandra O'Shea
*Assistant Examiner*—Bryan P. Stanley
*Attorney, Agent, or Firm*—Pillsbury Madison & Sutro LLP

[57] ABSTRACT

An indicating instrument has a generally straight illumination lamp and a light conducting plate. The light conducting plate has V-shaped notches near the lamp at the back thereof and curved surfaces at the front thereof. The V-shaped notches have inclined surface for receiving light from the lamp and transmitting it to the curved surfaces. The light from the lamp is totally reflected by the curved surface to illuminate a dial plate effectively.

7 Claims, 8 Drawing Sheets

INDICATING INSTRUMENT HAVING LIGHT CONDUCTING PLATE

CROSS REFERENCE TO RELATED APPLICATION

This application is a CIP application of application Ser. No. 08/814,020, filed Mar. 10, 1997 now abandoned.

BACKGROUND OF THE INVENTION

1. Field of the Invention

The present invention relates to a light conducting unit and an indicating instrument employing the same, especially, used for an automobile.

2. Description of Related Art

An indicating instrument which has an acrylic light conducting plate and a straight cold cathode fluorescent lamp disposed at the back of the light conducting plate is well-known. However, it has been a subject of preventing the light from leaking outside from the conducting plate without significant increase of the thickness of the light conducting plate.

SUMMARY OF THE INVENTION

The present invention has an object to provide a light conducting plate which receives light emitted by a substantially straight lamp from the back of a light conducting plate without thickening the light conducting plate and guides the light from the lamp to the light conducting plate effectively.

To achieve the aforementioned object of the present invention, the light conducting plate has a light incidence section on the back and a light reflecting section on the front thereof and the light incidence section has an inclined surface at a specific angle with respect to the back of the light conducting plate so that the incident light from the incidence section is totally reflected on a curved surface of the light reflecting front section.

Because both the inclined surface and the curved surface are combined suitably at the specific angle, the light conducting plate can be made thin with reduced cost.

Because the substantially straight lamp is employed as a light source, the light can be emitted even.

Accordingly, even if the shape and position of the light transmitting portions are changed, the position and shape of the lamp do not have to be changed.

BRIEF DESCRIPTION OF THE DRAWINGS

Other objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
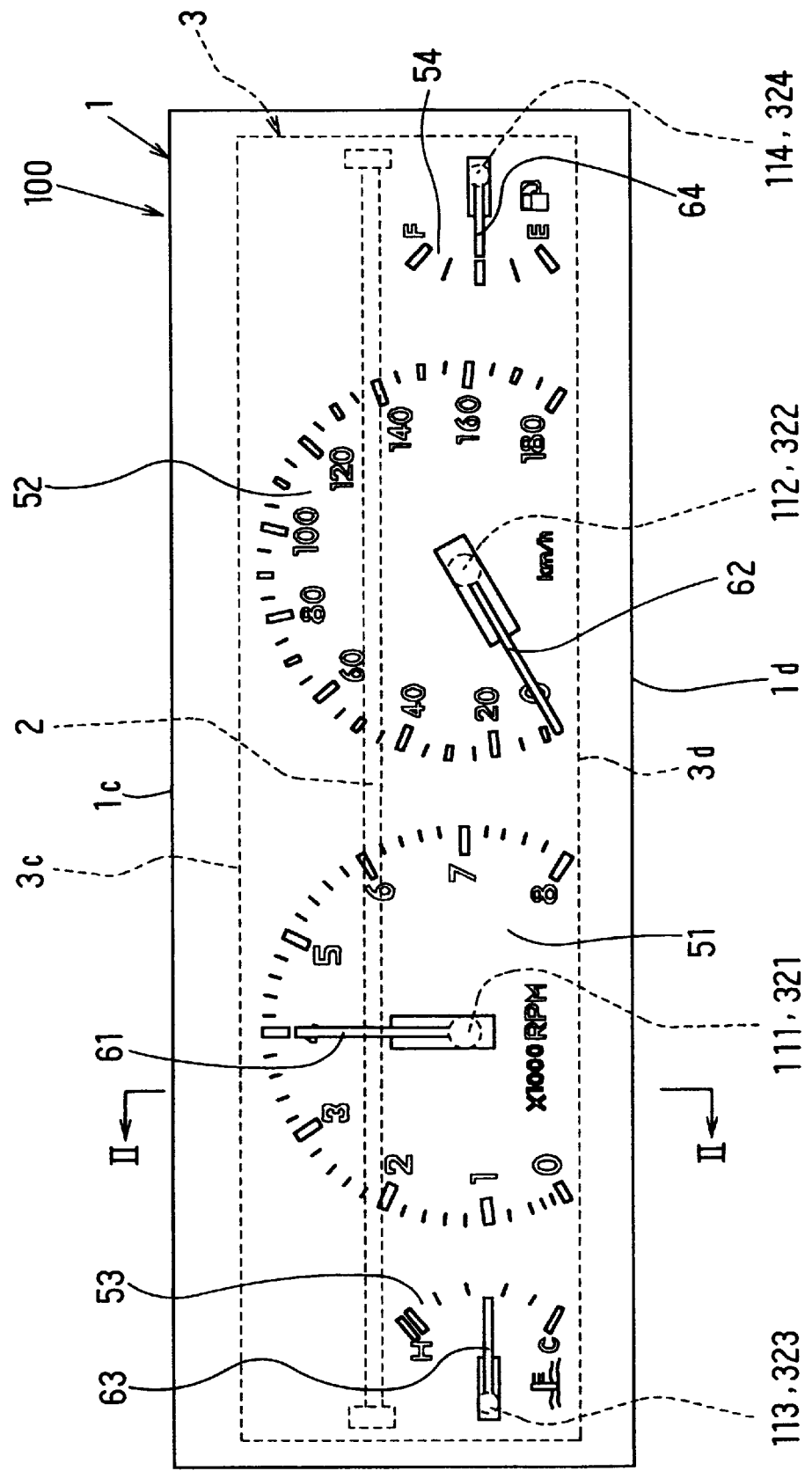
FIG. 1 is a front view of an indicating instrument according to a first embodiment of the present invention.

Preferred embodiments of the present invention are hereinafter described with reference to the accompanying drawings.

First Embodiment

An indicating instrument 100 according to a first embodiment is described with reference to FIGS. 1 to 4. The indicating instrument 100 is installed on the instrument panel at the front of the driver's seat of an automobile or a vehicle. A dial plate 1 is composed of a transparent rectangular plate member 11 and a black printed layer 12 formed on the front of the plate member 11. A plurality of patterned trans-illuminous portions 51–54 are formed by punching out the black printed layer 12 and by printing desired patterns on the same. The center of the dial plate 1 faces substantially the center of the driver's seat. The trans-illuminous portions 51 and 52 are arc-shaped scales indicating the engine r.p.m. and the vehicle speed, respectively.

The trans-illuminous portions 53 and 54 are scales indicating the water temperature and remaining quantity of fuel respectively. A light conducting plate 3 is a substantially rectangular plate member made of transparent light transmitting material such as acrylic resin, which is a little smaller than the dial plate 1. The light conducting plate 3 is mounted on the back 1b of the dial plate 1. A substantially straight cold cathode fluorescent lamp 2 which has approximately the same length as the longitudinal length of the light conducting plate 3 is mounted on the back 3b of the light conducting plate 3. The lamp 2 is disposed at a portion slightly higher than the horizontal center line of the light conducting plate 3. The cold cathode fluorescent lamp 2 turns on when the ignition switch of a vehicle is turned on.

The front 3a of the light conducting plate 3 has internal curved surfaces 31 and 32 formed longitudinally to face the lamp 2, which compose a light reflecting section. The curved surfaces 31 and 32 merge each other at one end thereof to form a crease 30 at a position directly facing the lamp 2, and extend to portions 31b and 32b away from the lamp 2 to merge straight surfaces of the light conducting plate 3 respectively so that the light conducting plate 3 gradually becomes thicker. The curved surfaces 31 and 32 are formed to be line-symmetrical with respect to the crease 30.

Figure 3:
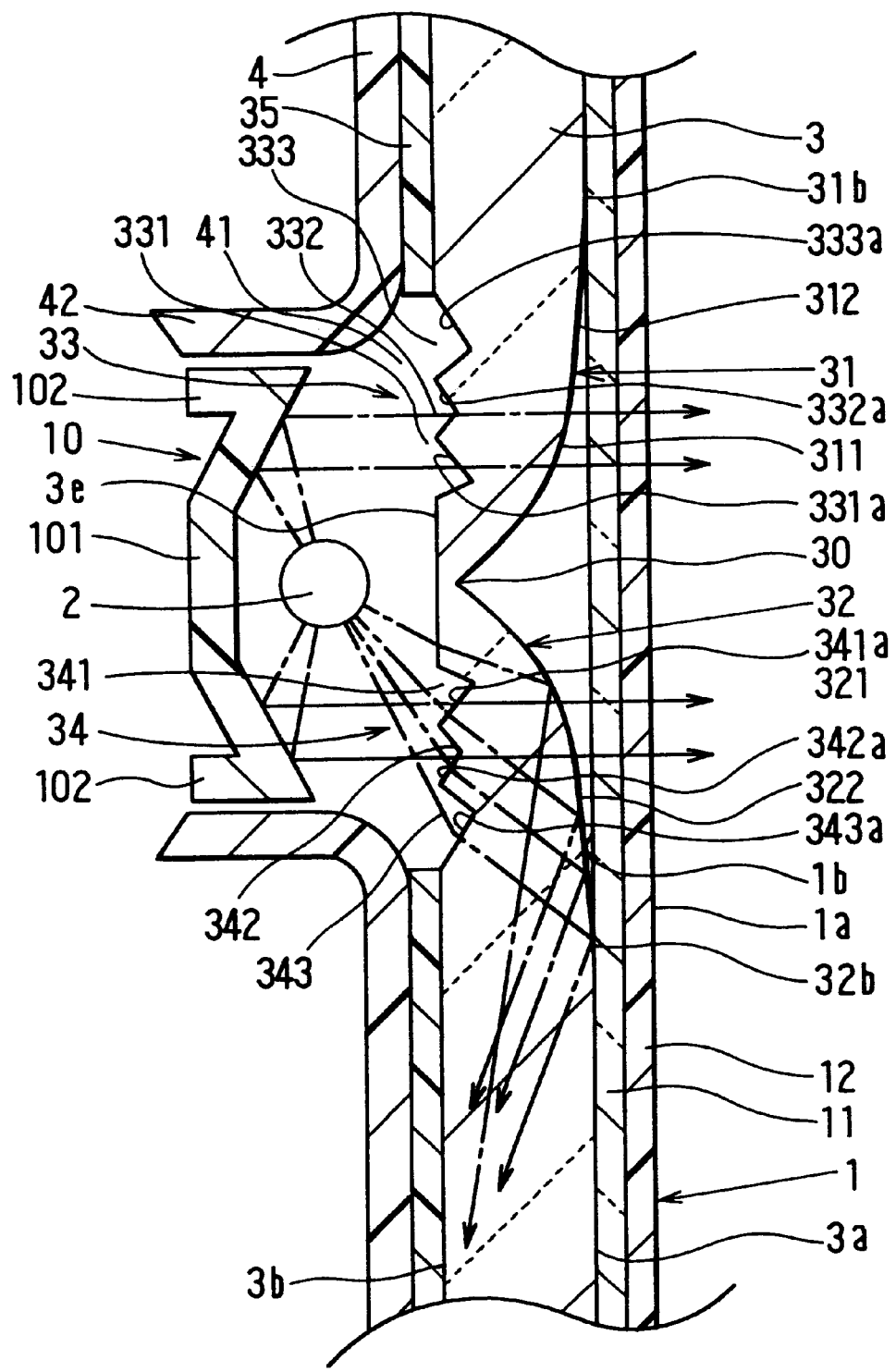
FIG. 3 is a partial enlarged view of a main portion shown in FIG. 2.

A flat surface 3e which directly faces the lamp 2 and notched portions 33 and 34 around the flat surface 3e are formed at the back 3b of the light conducting plate 3 to compose a light incidence section. As shown in FIG. 3, the notched portions 33 and 34 are formed to be line-symmetrical with respect to the crease 30 and have V-shaped three notches 331–333 and 341–343, each of which has an inclined surface facing the lamp 2.

The angles of the inclined surfaces 331a–333a and 341a–343a with respect to the curved surfaces 31 and 32 (or the back 3b of the light conducting plate 3) are set so that the light entering from the notches 331–333 and 341–343 and the flat surface 3e can be reflected totally on the curved surfaces 31 and 32.

Figure 4:
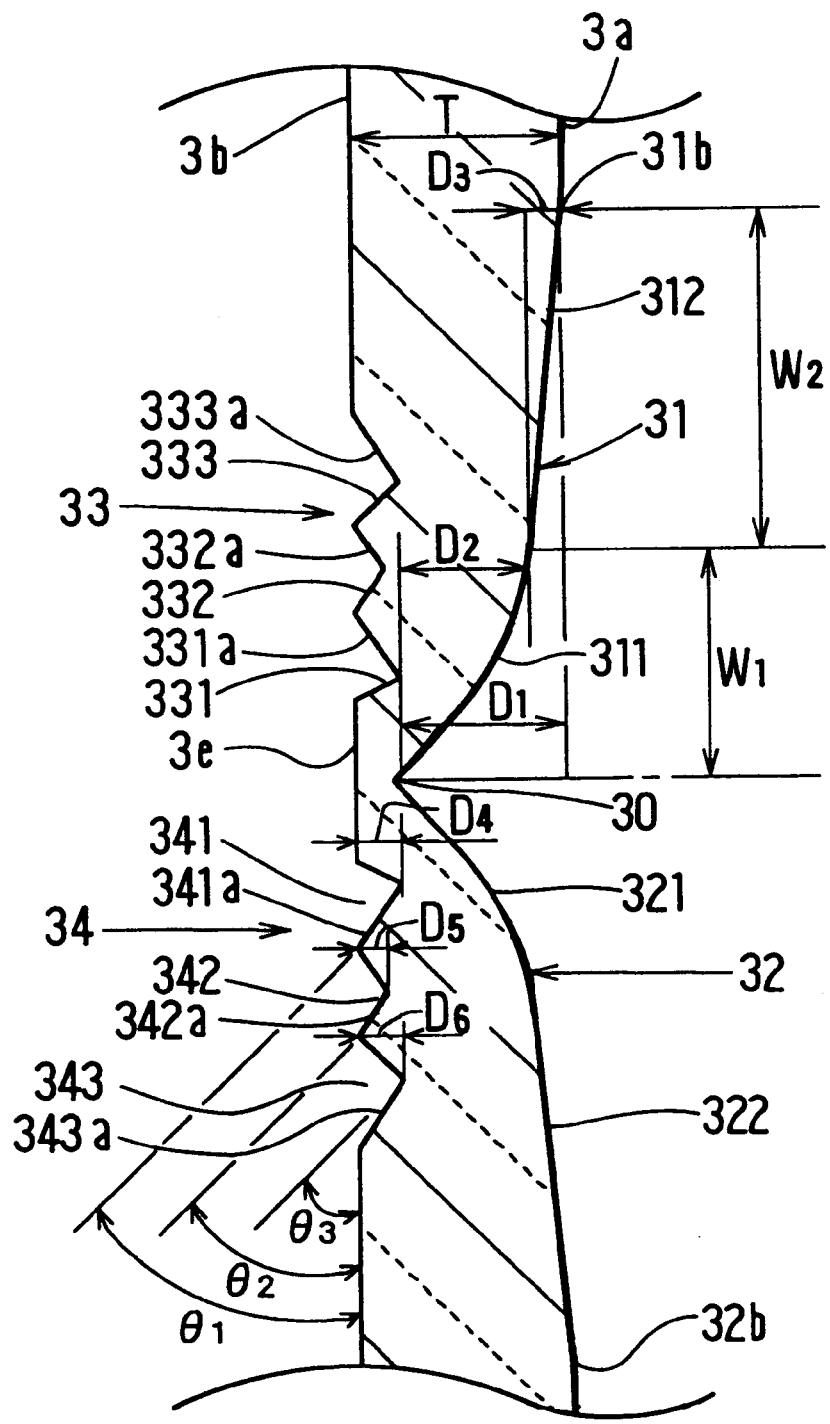
FIG. 4 is a partial enlarged view of a light conducting plate shown in FIG. 2.

The curved surface 31 is composed of a cylindrical surface 311 having a width W1 and an inclined surface 312 having a width W2 as shown in FIG. 4 so that all the light entering the flat surface 3e is conducted to the cylindrical surface 311 to be totally reflected on the curved surface 311.

On the other hand, all the light entering the inclined surfaces 331a–333a enters the inclined surface 312 to be totally reflected thereon. The curved surface 32 is composed of a cylindrical surface 321 and a flat inclined flat surface 322. The critical angle of the light incidence to the curved surfaces 31 and 32 of the acrylic light conducting plate 3 is 42° 9'. If the light enters the curved surfaces 31 and 32 at an angle larger than this critical angle, the light is totally reflected.

The thickness T of the light conducting plate 3 is 5 mm, and the depth D1 of the curved surfaces 31 and 32 is 4.5 mm. The width W1 of the cylindrical surface 311 is 5.91 mm, and the depth D2 thereof is 3.58 mm. The the cylindrical surface 311 has 8.19 mm radius. The width W2 of the inclined surface 312 is 8.47 mm, and the height D3 is 0.92 mm.

The depth D4 of the notch 341 is 0.97 mm. The inclination angle θ1 of the inclined surface 341a with respect to the back 3b of the light conducting plate 3 is 38°28'. The depth D5 of the notch 342 is 0.71 mm and the inclination angle θ2 of the inclined surface 342a is 30°. The depth D6 of the notch 343 is 0.91 mm, and the inclination angle θ3 of the inclined surface 343a is 30. The notches 331–333 are constructed in the same way as the notches 341–343.

As shown in FIG. 3, a white reflection layer 35 is disposed on the back 3b of the light conducting plate 3 except the light incidence section including the flat surface 3e and the notches 331–333 and 341–343. The white reflection layer 35 reflects the light in the light conducting plate 3 toward the trans-illuminous portions 51–54 of the dial plate 1.

Figure 2:
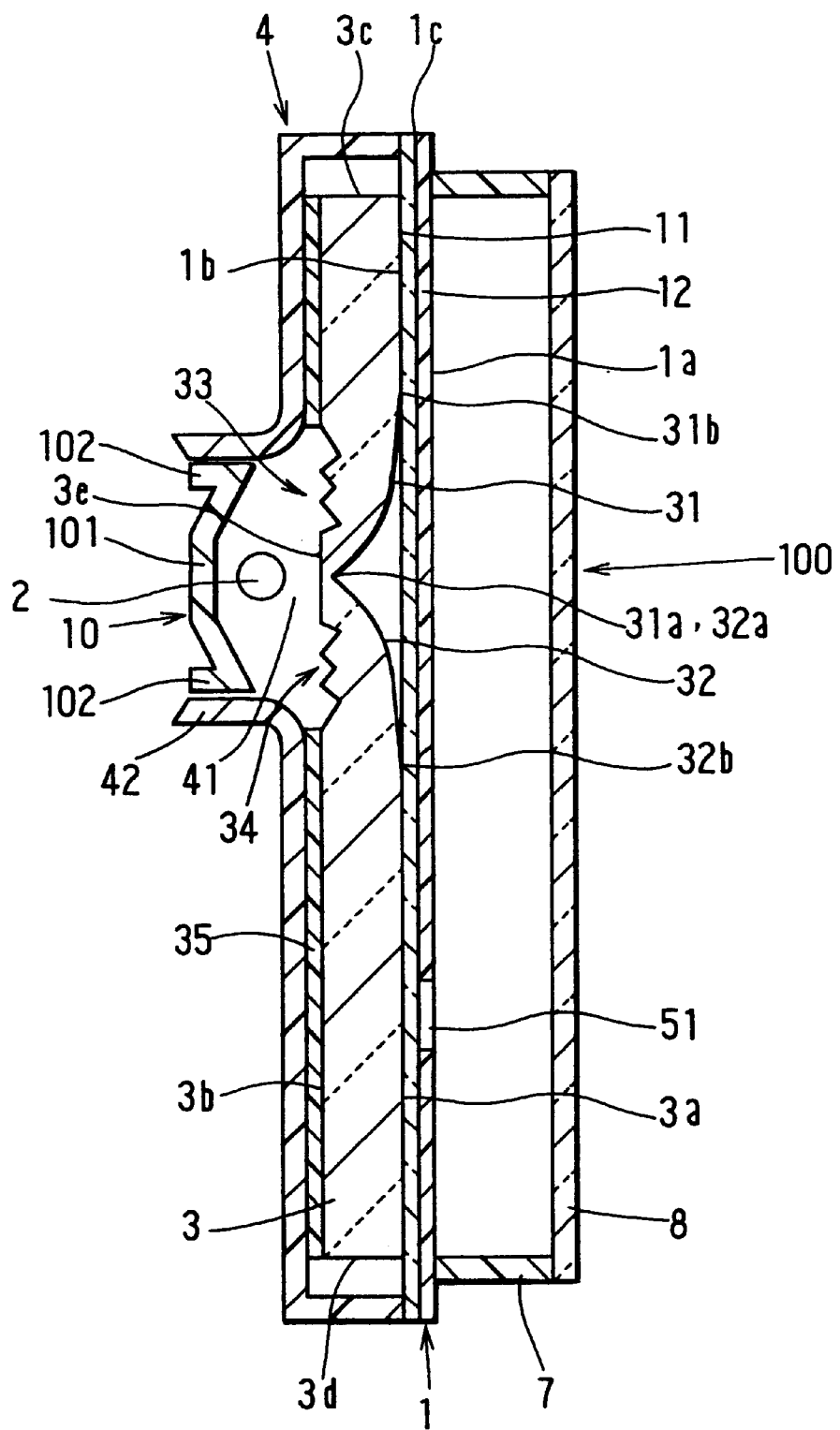
FIG. 2 is a cross-sectional view taken along a line II—II of FIG. 1 according to the first embodiment.

As shown in FIG. 2, a bowl-shaped cover member 4, which is made of a light shading material such as whitish polypropylene or the like, covers the back 3b of the light conducting plate 3. A window 41 opens at the bottom of the cover to expose the light incidence section including the notches 331–333, 341–343 and the flat surface 3e. Accordingly, light emitted from the cold cathode fluorescent lamp 2 enters only through the notches 331–333, 341–343 and the flat surface 3e. A flange 42 projects perpendicularly to the light conducting plate 3 at the outer periphery of the window 41,.

A reflection panel 10 is fitted to the inner periphery of the flange 42 to support the lamp 2. A reflection rate of the refection panel 10 is set so that the quantity of the light reflected on the reflection panel 10 through the light incidence section to the trans-illuminous portions 51–54 is generally equal to the quantity of the light reflected on the reflection layer 35 to the trans-illuminous portions 51–54 of the dial plate 1. As a result, all the trans-illuminous portions are illuminated uniformly. The reflection rate of the reflection panel can be changed by adjusting brightness of the reflection panel 10. A gray material is preferably used for the reflection panel 10 for this reason.

The reflection panel 10 has a generally cylindrical reflection portion 101 formed in parallel with the lamp 2 and mounting supports 102 formed at the upper and lower sides of the reflection portion 101 to support the panel 10 inside the flange 42 of the cover member 4. As shown in FIG. 1, the indicating instrument 100 has pointers 61–64 indicating vehicle speed (r.p.m.), water temperature and fuel amount, and respective driving units (not shown) for driving the pointers 61–64.

The dial plate 1 and the light conducting plate 3 have through-holes 111–114 and through-holes 321–324, through which driving shafts (not shown) extend.

As shown in FIG. 2, a light shading cover 7 made of light shading material such as polypropylene surrounds the pointers 61–64 at the outer periphery of the front 1a of the dial plate 1. A smoked front panel 8 which has a light transmitting rate less than 20% is placed on the light shading cover 7 to cover the front 1a of the dial plate 1. The front panel 8 shades the inside of the indicating instrument 100 from sight when the lamp 2 is off, and functions as a black face to show only the trans-illuminous portions 51–54 when the lamp 2 is on.

When the cold cathode fluorescent lamp 2 is on, the light emitted by the lamp 2 enters the flat surface 3e of the back 3b of the light conducting plate 3 and the inclined surfaces 331a–333a and 341a–343a of the notched portions 33 and 34. This emitted light is totally reflected on the curved surfaces 31 and 32 of the light conducting plate 3 and guided to the top 3c and the bottom 3d (FIG. 2) of the light conducting plate 3. Then, the light is reflected on the top 3c and the bottom 3d toward the center of the light conducting plate 3.

Thus, the light which enters the light conducting plate 3 once is prevented from leaking outside. The reflection layer 35 disposed at the back 3b of the light conducting plate 3 effectively reflects the light to the trans-illuminous portions 51–54 in the dial plate 1.

At the same time, the light emitted from the back 2b of the lamp 2 enters the reflection panel 10 and reflected to the incidence section. Most of the incident light goes to the dial plate 1 at substantially right angles after being reflected perpendicularly on the light incidence section of the light conducting plate 3. The quantity of the light entering the trans-illuminous portions 5114 54 from the reflection panel 10 and the quantity of the light entering the trans-illuminous portions 51–54 from the reflection layer 35 at the back 3b of the light conducting plate 3 are generally the same, which illuminates the entire surface of the trans-illuminous portions 51–54 uniformly.

Each inclined angle of the inclined surfaces 331a–333a and 341a–343a can be changed depending on the shape of the curved surfaces 31 and 32.

Because the inclined surfaces 331a–333a and 341a–343a in the notched portions 33 and 34 directly face the lamp 2, the light emitted by the lamp 2 enters the light conducting plate 3 effectively.

Because the reflection panel 10 has an achromatic color such as gray, the tone of the color of the light emitted by the cold cathode fluorescent lamp 2 is not changed.

Because the light conducting plate 3 guides the light emitted by the lamp 2 to illuminate the trans-illuminous portions 51–54 entirely, the same shape of the cold cathode fluorescent lamp 2 can be used at the same position no mater how shapes and positions of the trans-illuminous portions 51–54 change.

Second Embodiment

Figure 5:
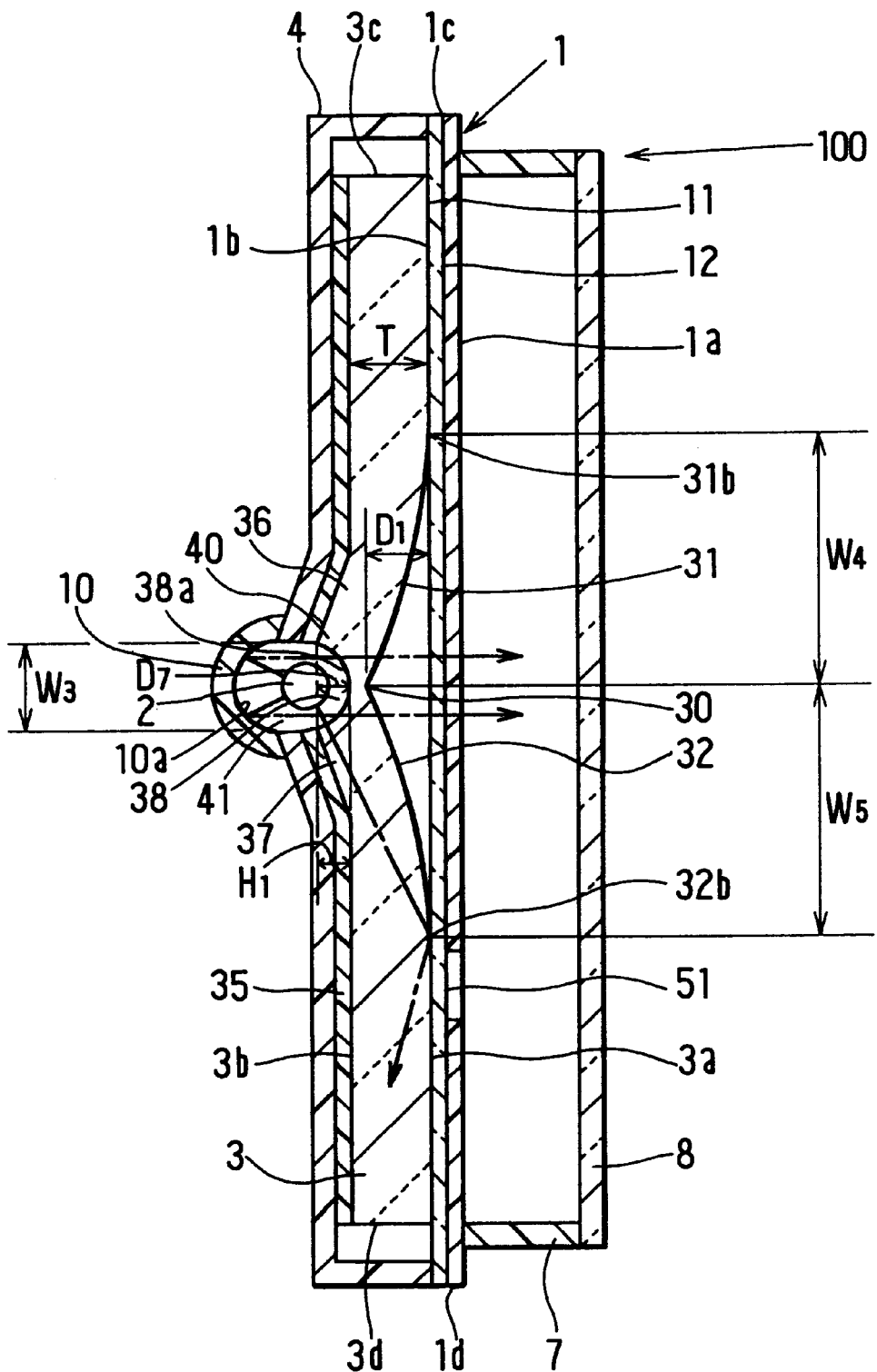
FIG. 5 is a cross-sectional view of a portion of an indicating instrument according to a second embodiment of the present invention.

A second embodiment is hereinafter explained with reference to FIG. 5.

A swelling 40 is formed by two sloping portions 36 and 37 of the back 3b of the light conducting plate 3 to face the cold cathode fluorescent lamp 2. A semi-cylindrical groove 38 which has a width W3 larger than the diameter of the lamp 2 is formed at the top of the swelling to surround the cold cathode fluorescent lamp 2.

The light emitted by the lamp 2 enters a cylindrical surface 38a of the semi-cylindrical groove 38.

The radiuses of the curved surfaces 31 and 32 and the cylindrical surface 38a are set to have an angle between both surfaces so that the curved surfaces 31 and 32 can totally reflect the incident light from the cylindrical surface 38a of the semi-cylindrical groove 38. For example, the thickness T of the light conducting plate 3 is 5 mm, the depth D1 of the curved surfaces 31 and 32 is 4.3 mm, and the width W4, W5 of the curved surfaces 31, 32 are 6.7 mm. The height H1 of the swelling 40 formed by the sloping portions 36 and 37 is 2.5 mm. The width W3 of the semi-cylindrical groove 38 is 5 mm, and the depth D7 thereof is 2.5 mm. The cross-sectional shape of the curved surfaces 31 and 32 is a part of an oval having a 36. 7 mm long axis and a 16.1 mm short axis.

A white reflection layer 35 is formed by printing on the portion of the back 3b of the light conducting plate 3 except the cylindrical surface 38a. Portions of the cover member 4 facing the sloping portions 36 and 37 of the light conducting plate 3 have inner surfaces almost the same shape as the outer surfaces of the sloping portions 36 and 37.

The cover member 4 has a window 41 at the portion facing the cylindrical surface 38a so that the light from the lamp 2 is transmitted only from the inclined surface 38a at the back 3b of the light conducting plate 3. The reflection panel 10 having a substantially semi-cylindrical shape is mounted around the outer periphery of the window 41.

Because the light emitted from the cold cathode fluorescent lamp 2 enters the cylindrical surface 38a of the semi-cylindrical groove 38 perpendicularly, the light is hardly refracted on the cylindrical surface 38a and enters the front 3a of the light conducting plate 3. Therefore, the light from the lamp 2 enter the front 3a of the light conducting plate 3 at an incident angle above the critical angle more surely as compared to the first embodiment.

Third Embodiment

Figure 6:
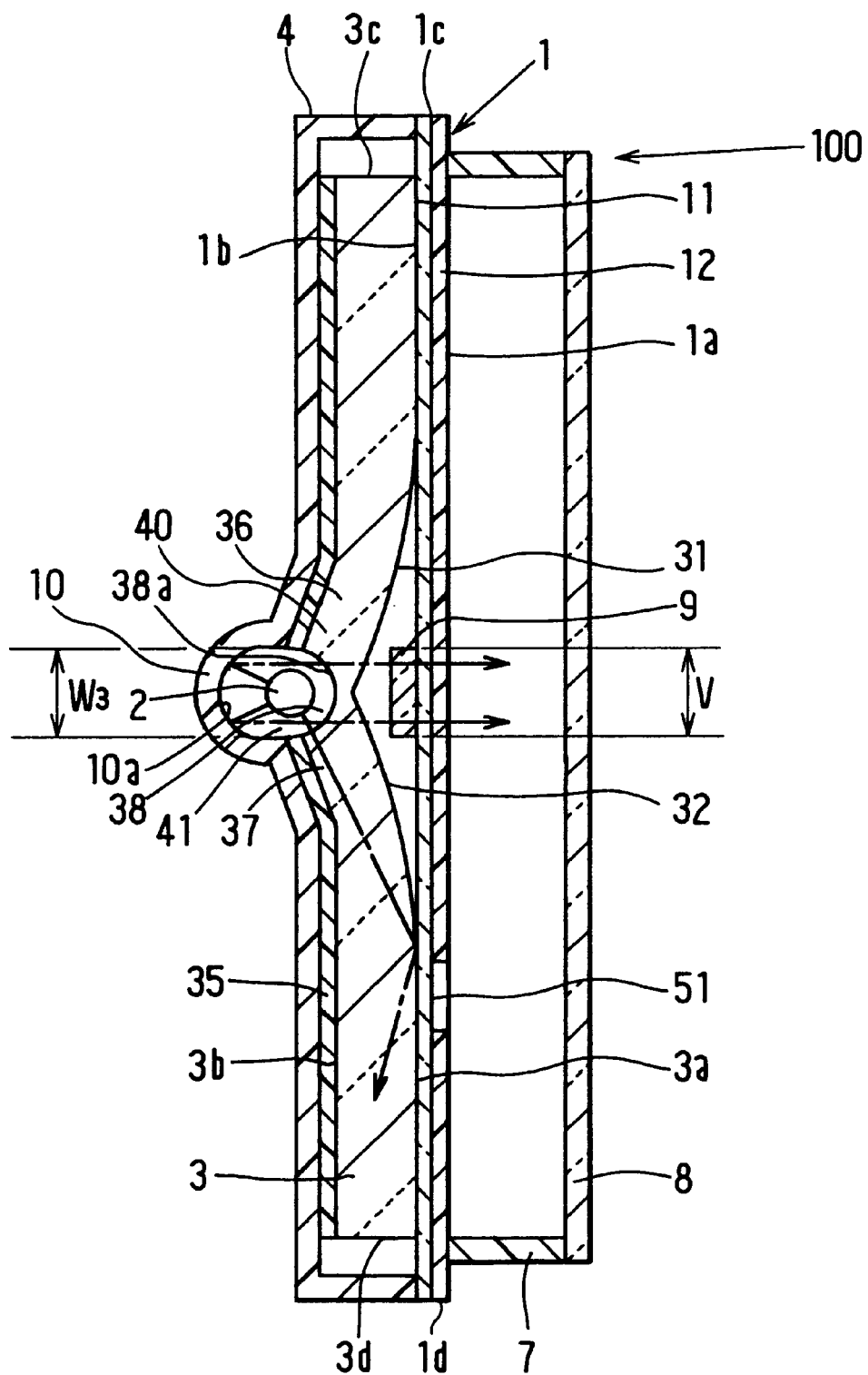
FIG. 6 is a cross-sectional view of a portion of an indicating instrument according to a third embodiment of the present invention.

An indicating instrument according to a third embodiment is hereinafter explained with reference to FIG. 6. The reflection panel 10 in the second embodiment is integrated with the cover member 4 made of white resin. A milky white light diffusing plate 9 is disposed on the front 3a of the light conducting plate 3 between the curved surfaces 31 and 32 thereof. The light diffusing plate 9 has almost the same length as the longitudinal length of the cold cathode fluorescent lamp 2. The width V of the light diffusing plate 9 is similar to the width W3 of the semi-cylindrical groove 38 of the light conducting plate 3. The light diffusing plate 9 is made of a transparent material mixed with beads and is bonded to the dial plate 1.

The light diffusing rate of the light diffusing plate 9 is adjusted so that the quantity of the light entering the portions facing the light diffusing plate 9 of the trans-illuminous portions 51–54 is generally equal to the quantity of the light entering the trans-illuminous portions 51–54 except the portions facing the light diffusing plate 9. Practically, the light diffusing rate can be increased by adding the beads.

Because the reflection panel 10 in the third embodiment is made of material whose reflection rate is high, the quantity of the light reflected on the reflection panel 10 is larger than the first embodiment.

Fourth Embodiment

Figure 7:
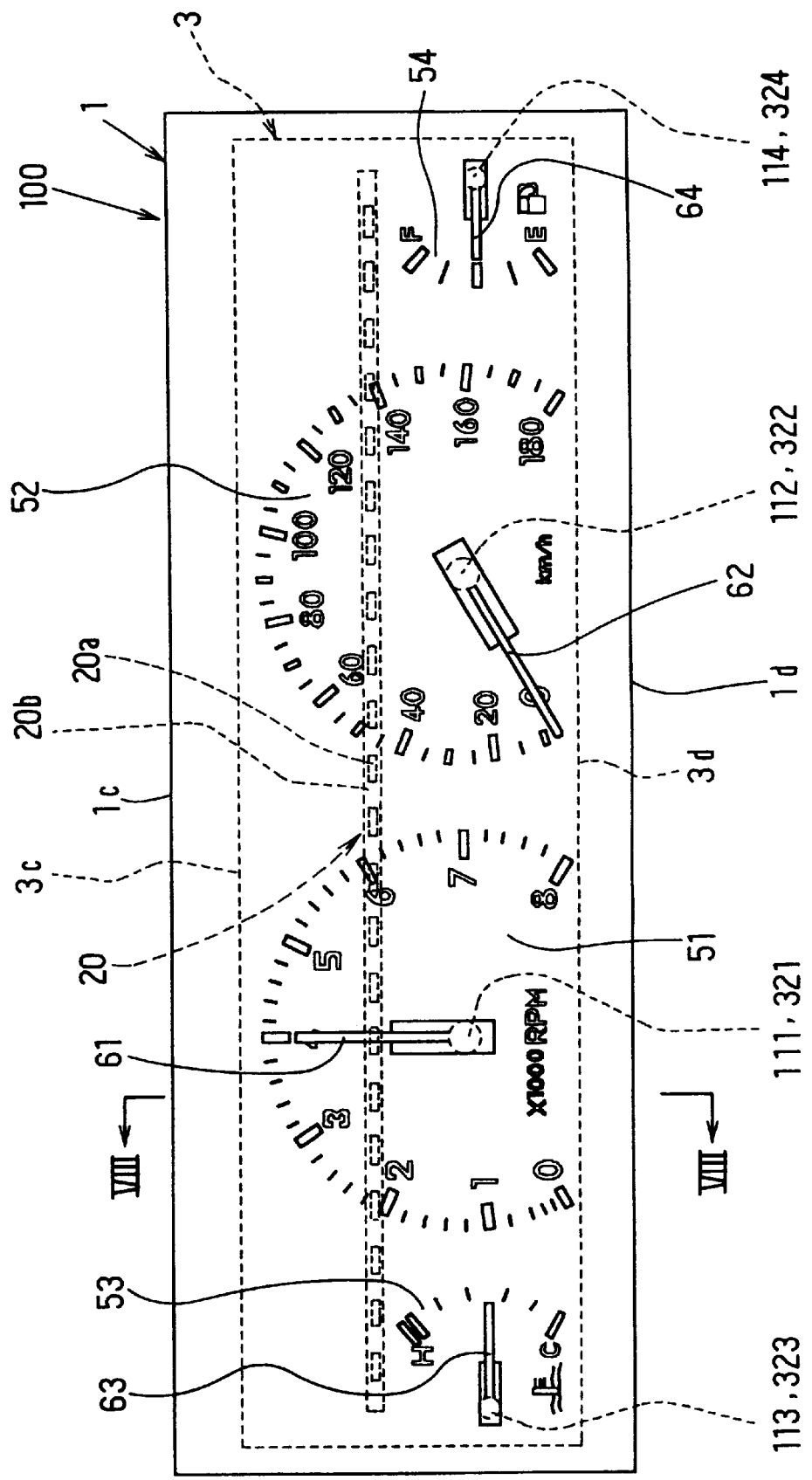
FIG. 7 is a front view of an indicating instrument according to a fourth embodiment of the present invention.
Figure 8:
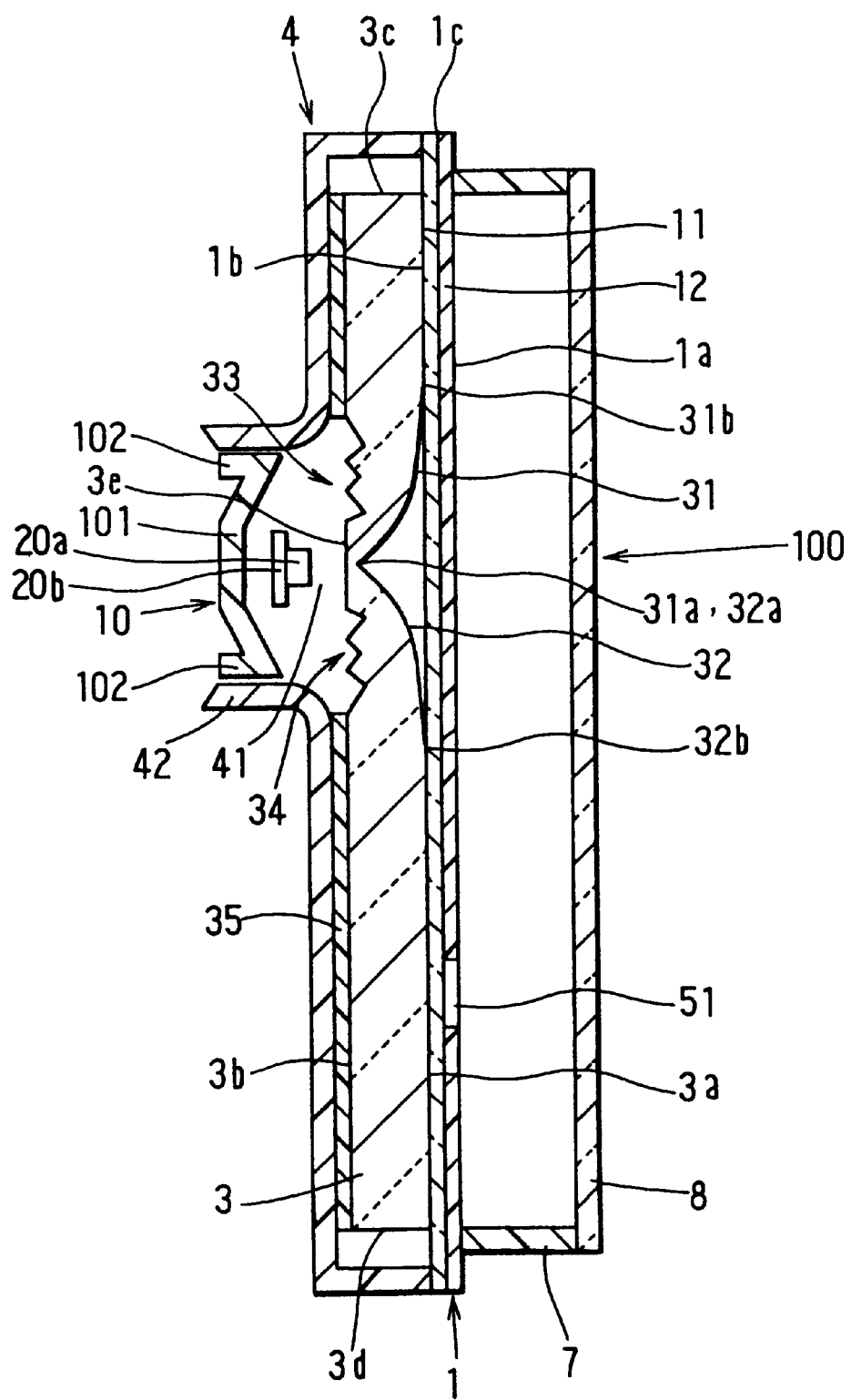
FIG. 8 is a cross-sectional view taken along a line VIII—VIII of FIG. 7 according to the fourth embodiment.

An indicating instrument according to a fourth embodiment is hereinafter explained with reference to FIG. 7 and 8. A straight lamp 20 in this embodiment is substituted for the cold cathode fluorescent lamp 2 of the indicating instrument according to the first embodiment. The straight lamp 20 is composed of a plurality of LEDs 20a (light emitting diodes) and a printed board 20b for supporting the plurality of LEDs 20a at generally equal intervals.

Variations

Although the notched portions 33 and 34 are made of three V-shaped notches 331–333, and 341–334 according to the first embodiment, the number of the V-shaped notches can be changed, for example, it can be less than two or more than four.

The first embodiment does not have a V-shaped notch on the surface 3e facing the cold cathode fluorescent lamp 2, however, the flat surface 3e may have a V-shaped notch.

The depth of the V-shaped notches 331–333 and 341–334, the inclination angle of the inclined surfaces 331a–333a and 341a–334a may be changed appropriately.

The three V-shaped notches 331–333 and 341–334 form the notched portions 33 and 34, however, the number of the V-shaped notches 331–333 of the notched portion 33 may be larger than that of the V-shaped notches 341–343 of the notched portion 34. The larger the number of the V-shaped notches is, the more the light from the cold cathode fluorescent lamp 2 can enter the light conducting plate 3 and, therefore, conducting more light to the bottom 3d of the light conducting plate 3.

Although the first and second embodiments have gray reflection panel 10 made of achromatic resin, the reflection panel 10 can be made of chromatic material.

The back 3b of the light conducting plate 3 can be matted to efficiently diffuse the light.

The printed layer 35 can be formed on the portion other than the cylindrical surface 38a and sloping portions 36 and 37, and the reflection panel 10 may be formed at the portion facing the cylindrical surface 38a and the sloping portions 36 and 37. The portions having the printed layer 35 can be a flat surface, which makes a printing process of the printed layer 35 simple.

A light diffusing panel made of a grayish material, whose reflection rate is slightly lower than the white material, can be also adopted to the indicating instrument 100.

The portion facing the incident surface 34a at the back 1b of the dial plate 1 can be matted to diffuse the light.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An indicating instrument including a dial plate, a light conducting plate disposed on the back of said dial plate and a generally straight illumination lamp disposed at the back of said light conducting plate, said light conducting plate comprising:

a generally flat circumferential light conducting section for illuminating said dial plate;

a light incidence section disposed integrally with said light conducting section having a light incidence back surface directly facing said lamp and a light reflecting front surface disposed to correspond to said light incidence back surface;

wherein said light incidence back surface comprises a notched portion having an inclined surface facing said lamp at an angle with respect to said light reflecting front surface, said light reflecting front surface comprises a curved surface for reflecting incident light of said inclined surface toward said circumferential light conducting section, and said angle of said inclined surface with respect to said curved surface is in a range so that incidence light of said light incidence back surface is totally reflected on said curved surface.

2. An indicating instrument as claimed in claim 1, wherein said notched portion of said light incidence section has a V-shaped notch.

3. An indicating instrument as claimed in claim 1, wherein said notched portion comprises a plurality of notches each of which has an inclined surface generally facing said lamp at an angle in said range with respect to said curved surface.

4. An indicating instrument as claimed in claim 3 further comprising a reflection panel, longitudinally disposed at the back of said lamp, for reflecting light of said lamp toward said light incidence section, wherein said dial plate has a plurality of trans-illuminous portions for indicators; and said light conducting plate further comprises a reflection layer disposed on the back of said circumferential light conducting section except said light incidence section.

5. An indicating instrument as claimed in claim 4, wherein said reflection panel is made of grayish material to control reflection rate thereof.

6. An indicating instrument as claimed in claim 4 further comprising a light diffusing member, disposed in front of said lamp between said light conducting plate and said dial plate, for diffusing light coming out of said reflection panel.

7. An indicating instrument comprising:

a dial plate;

a light conducting plate disposed on the back of said dial plate and a generally straight illumination lamp disposed at the back of said light conducting plate; wherein said light conducting plate comprises a generally flat light conducting section for illuminating said dial plate; a light incidence section disposed integrally with said light conducting section having a light incidence back surface directly facing said lamp and a light reflecting front surface disposed to correspond to said light incidence back surface, said light incidence back surface comprises a notched portion having an inclined surface facing said lamp at an angle with respect to said light reflecting front surface, said light reflecting front surface comprises a curved surface for reflecting incident light of said inclined surface toward said light conducting section, said angle of said inclined surface with respect to said curved surface is in a range so that incidence light of said light incidence back surface is totally reflected on said curved surface, and said illumination lamp comprises a plurality of light emitting elements and a printed circuit board for supporting said plurality of light emitting elements and supplying electric power thereto.

* * * * *